(12) United States Patent
Van Phan et al.

(10) Patent No.: US 9,578,550 B2
(45) Date of Patent: Feb. 21, 2017

(54) METHOD AND APPARATUS FOR DEVICE-TO-DEVICE COMMUNICATION

(75) Inventors: Vinh Van Phan, Oulu (FI); Sami Hakola, Kempele (FI); Timo Koskela, Oulu (FI); Esa Tuomaala, Helsinki (FI); Gilles Charbit, Farnborough (GB)

(73) Assignee: Nokia Solutions and Networks Oy, Espoo (FI)

( * ) Notice: Subject to any disclaimer, the term of this patent is extended or adjusted under 35 U.S.C. 154(b) by 220 days.

(21) Appl. No.: 13/700,252

(22) PCT Filed: May 28, 2010

(86) PCT No.: PCT/EP2010/057416
§ 371 (c)(1),
(2), (4) Date: Feb. 25, 2013

(87) PCT Pub. No.: WO2011/147462
PCT Pub. Date: Dec. 1, 2011

(65) Prior Publication Data
US 2013/0150051 A1    Jun. 13, 2013

(51) Int. Cl.
*H04W 4/00* (2009.01)
*H04W 36/00* (2009.01)
*H04W 76/02* (2009.01)
*H04W 12/04* (2009.01)
(Continued)

(52) U.S. Cl.
CPC ......... *H04W 36/0011* (2013.01); *H04W 12/04* (2013.01); *H04W 76/023* (2013.01); *H04W 36/00* (2013.01); *H04W 48/00* (2013.01); *H04W 72/0406* (2013.01)

(58) Field of Classification Search
CPC . H04W 76/023; H04W 76/025; H04W 76/043
See application file for complete search history.

(56) References Cited

U.S. PATENT DOCUMENTS

| | | | |
|---|---|---|---|
| 2002/0176382 A1* | 11/2002 | Madour | H04W 76/041 370/331 |
| 2005/0239451 A1* | 10/2005 | Periyalwar et al. | 455/425 |
| 2006/0252369 A1* | 11/2006 | Rasanen | 455/39 |

(Continued)

OTHER PUBLICATIONS

"Universal Mobile Telecommunications System (UMTS); LTE; Network sharing; Architecture and functional description (3GPP TS 23.251 version 9.2.0 Release 9)", Technical Specification, European Telecommunications Standards Institute (ETSI), 650, Route Des Lucioles ; F-06921 Sophia-Antipolis ; France, vol. 3GPP SA 2, No. V9.2.0, Mar. 1, 2010, XP014046433.

*Primary Examiner* — San Htun
(74) *Attorney, Agent, or Firm* — Harrington & Smith

(57) ABSTRACT

A method of controlling device-to-device communications between user equipment, including using a network control element, which is common to a plurality of networks, including controlling any of the following functions: network access control functions, connection set-up, resource allocation, mode switching, handover, security and/or charging. Also a method of controlling handovers or connections in a device-to-device communications between a first and a second user equipment wherein the control is performed, at least in part, said first or second user equipments. Alternatively the user equipment may send reports a handover/connection is initiated/controlled based on said report.

16 Claims, 6 Drawing Sheets

(51) Int. Cl.
*H04W 48/00* (2009.01)
*H04W 72/04* (2009.01)

(56) References Cited

U.S. PATENT DOCUMENTS

| | | |
|---|---|---|
| 2007/0115884 A1* | 5/2007 | Shang ................... H04W 36/30 370/331 |
| 2007/0129076 A1* | 6/2007 | Cho et al. ..................... 455/436 |
| 2007/0153747 A1* | 7/2007 | Pan ....................... H04W 36/14 370/338 |
| 2008/0002658 A1* | 1/2008 | Soliman ........................ 370/343 |
| 2008/0108378 A1* | 5/2008 | Gessner et al. ............... 455/513 |
| 2010/0009675 A1 | 1/2010 | Wijting et al. |
| 2010/0220687 A1* | 9/2010 | Reznik et al. ................. 370/331 |
| 2011/0098043 A1* | 4/2011 | Yu et al. ..................... 455/435.1 |
| 2011/0258327 A1* | 10/2011 | Phan et al. .................... 709/227 |

* cited by examiner

METHOD AND APPARATUS FOR DEVICE-TO-DEVICE COMMUNICATION

BACKGROUND OF THE INVENTION

1. Field of the Invention

Embodiments relate to communication systems and have particular, but not exclusive application in Long Term Evolved Advanced LTE-A networks and systems. Embodiments have particular application to device-to-device (D2D) communications.

2. Description of the Related Art

A communication system can be seen as a facility that enables communication sessions between two or more entities. The communications may comprise, for example, communication of voice, electronic mail (email), text message, multimedia, other data and so on. A communication system can be provided for example by means of a communication network and one or more compatible communication devices. The communication network may be a local network. A user can access a communication system by means of an appropriate communication device. A communication device of a user is often referred to as user equipment (UE). A communication device is provided with an appropriate signal receiving and transmitting apparatus for enabling communications, for example enabling fixed or wireless access to a communication network or communications directly with other users. Users may thus be offered and provided numerous services via their communication devices. Non-limiting examples of these services include two-way or multi-way calls, data communication or multimedia services or simply an access to a data communications network system, such as the Internet. A user who has accessed a system may also be provided broadcast or multi-cast content. Non-limiting examples of the content include downloads, television and radio programs, videos, advertisements, various alerts and other information. Communication networks typically comprise a plurality of base stations, or Node Bs, with which a UE can communicate when located in a cell for which a base station has coverage. These are often under the control of a network controller.

In order to provide easier and faster communications, device-to-device (D2D) communications technologies are known which use radio resources of a hosting cellular system, whilst allowing two user equipments to communicate directly with each other when in radio contact; i.e. without routing via base stations, radio networks etc. Mobile cellular device-to-device (D2D) communications are also referred to as mobile-to-mobile (M2M), machine-to-machine (M2M), terminal-to-terminal (T2T) or peer-to-peer (T2T) communications.

Mobile cellular D2D communications may be assumed to use a licensed radio spectrum and eventually an unlicensed spectrum extension under control of supporting cellular systems, and may use the same radio resources of supporting cellular systems. The advantages of direct D2D communications into a cellular network includes reducing transmitter power consumption in both device and network, improving the spectrum efficiency and network resource utilization, and increasing cellular network capacity and coverage.

In cellular integrated D2D, as the same radio resources of supporting cellular system may be used for direct D2D communications, the D2D resource allocation is preferably under the control and management of the cellular system so as to avoid interference between cellular and D2D users. However, normal resource allocation, monitoring and control in current cellular networks are not designed for localised and distributed D2D communications in which user equipment data transmission (as well as control signaling) happen (at least in part) directly between two or multiple UEs. A particular user equipment may not be considered as "trusted" entity from the view of an operator's network; and thus when allowing more user equipment more distributed control e.g. in conducting direct D2D communications, this creates the threat of unauthorized usage of radio resources.

Prior art systems have so far assumed UEs in D2D communications to be simply connected to the same cellular network. Thus there has been no consideration to multi-operator and/or multi-radio systems and problems arising therefrom. However there may be scenarios in which UEs (capable of D2D communications using certain Radio Access Technology (RAT) are subscribers of different competing operators which provide cellular access using similar or different RAT in an overlapping service area.

The UEs in these scenarios may have to select to camp-in or connect to, different cells and systems to that of their home operator's networks, as the operators may not support roaming for mobile users due to roaming restrictions. Therefore, even when UEs are located within D2D range of each other, they may need to communicate with each other using the traditional, resource-consuming access nodes via their home networks which are then interconnected via PSTN or the Internet. If the UEs are communicating via independent or separated radio access networks of different cellular operators, it may be difficult for an independent network to decide or detect that communicating devices are close to each other and to evaluate whether to try to setup a D2D connection.

BRIEF SUMMARY OF THE INVENTION

It is an object of embodiments to provide effective solutions so as to support direct D2D communications in multi-operator, multi-radio environments. Thus embodiments allow efficient coordination, control and allocation of resources to those UEs across multiple operators' administrative domains. Embodiments may provide support of network-initiated D2D communications in particular.

In a first embodiment is provided a method of controlling device-to-device communications between user equipment, comprising using a network element, which is common to a plurality of networks, to control any of the following functions: a) network access control functions including any of authentication of device-to-device users, admission control, selection or resection of hosting Radio Access Networks (RAN) or base stations, coordination of selected hosting Radio Access Networks, connection set-up, resource allocation, mode switching, handover, security, charging; b) mobility management functions including any of device-to-device registration and reachability, mobility restriction, Radio Access Network change hosting, and/or mode switching; c) security functions including any of: coordination, derivation and/or distribution of device-to-device security key components for device-to-device sessions, d) radio resource management functions including any of the following: inter-system or inter-cell coordination for device-to-device, resource allocation, setting and controlling resource allocation parameters, redirecting device-to-device users to access other spectrum resources, hosting Radio Access Network, and/or e) network management functions, including a load balancing among involved network systems and spectrum resources.

The user equipments and/or networks may are operated by different parties.

The common network element may configure and/or manage multi-operator device-to-device registration areas.

The common network element may communicate with the user equipments under its supervision for security update requests, resource allocation requests and/or serving RAN relocation requests.

In a second embodiment is provided a network element which is common to a plurality of networks, adapted to control handovers/connections in device-to-device communications between user equipment and adapted to performing any of the following functions: a) network access control functions including any of authentication of device-to-device users, admission control and/or reselection of hosting RAN; and/or coordination of selected hosting RANs; connection set-up; resource allocation; mode switching; handover; charging b) mobility management functions: device-to-device registration and reachability, mobility restriction, hosting RAN change, and/or mode switching; c) security functions including any of coordination, derivation and distribution of device-to-device security key components for device-to-device sessions; d) radio resource management functions including any of: inter-system or inter-cell coordination for device-to-device resource allocation; setting and controlling certain resource allocation parameters; and redirecting device-to-device users to access other spectrum resources or hosting RAN, and/or e) network management functions, including a load balancing among involved network systems and spectrum resources.

The network element may be a device-to-device Registration Server Function (DRSF) or local server and/or adapted to configure and/or manage multi-operator device-to-device registration areas.

It may be adapted to communicate with user equipments under its supervision for security update requests, resource allocation requests and/or serving RAN relocation requests.

In a third embodiment is provided a method of controlling handovers or connections in a device-to-device communications between a first and a second user equipment wherein the control is performed, at least in part, said first or second user equipments.

The user equipments may belong to different networks.

The handover/connection may be performed using the initial resource allocation assigned by a common control node, DRSF, Radio Access Network or NodeB.

The method may include detecting that a device-to-device connection is moving out of the current serving cell and/or selecting suitable candidates for a targeted serving cell.

The method may include the step of measuring by one or more of said user equipments, Reference Symbol Received Power (RSRP) or any other parameter, from one or more neighbouring cells, and/or selecting the suitable target cells to re-establish the cellular connection.

The selecting may allocate priority to a cell under control of the same Common Control Node, DRSF, and/or having the same operator and/or the same Radio Access Technology (RAT) as that of the current serving cell.

The first user equipment may access the selected cell and/or send a handover request. The request may include information concerning current device-to-device connection such as current serving cell identity, and/or Common Network Node/DRSF identity.

The first user equipment may initiate a device-to-device to cellular mode switching request to the Common Network Node/DRSF.

In a fourth embodiment is provided a method of assisting control and/or initiation of connections and/or handovers in a device-to-device connection between a first and second user equipment comprising: receiving/sending reports from/by said first user equipment; and initiating and/or controlling a handover/connection based on said report.

The report may include data indicative of load-balancing and/or RSRP or other measurements and/or differences therebetween of the user equipments, and/or selected suitable candidates for a targeted serving cell The report is received/sent to/by a NodeB, RAN, common network node, DRSF and/or the other user equipment.

The common network node may designate which of said user equipments is said first user equipment and this may be based on capability, and/or status indications, and/or measurement reports from user equipments and/or serving RANs.

The report or data therein may be received beforehand from said second user equipment.

In a fifth embodiment is provided a user equipment or processor therefor, adapted for device-to-device communications with a second user equipment, further adapted to control and/or initiate, at least in part, handovers or connections in a device-to-device communication.

The user equipment may belong to a different network than said second user equipment.

The user equipment may be adapted to perform the handover/connection using the initial resource allocation assigned by a common control node, DRSF, Radio Access Network or NodeB and/or adapted to detect that a device-to-device connection is moving out of the current serving cell and/or selecting suitable candidates for a targeted serving cell.

It may be adapted to send reports pertaining to initiation and/or control of connections and/or handovers in a device-to-device connection between said a first user equipment and a second user equipment.

The user equipment may be further adapted to measure and/or report RSRP or other parameters, from one or more neighbouring cells, and/or to select the suitable target cells to re-establish the cellular connection and/or report said selected target cells.

It may be adapted to signal suitable target cells and/or said power/RSRP measurements to the other user equipments, base stations, Radio Access Networks, Common Network Nodes, or DRSF.

The user equipment may be adapted to allocate priority for said selection to a cell under control of the same Common Control Node, DRSF, and/or having the same operator and/or the same Radio Access Technology (RAT) as that of the current serving cell. It may be adapted to access the selected cell and/or send a handover request. The request may include information concerning current device-to-device connection; and/or current serving cell identity, and/or Common Network Node/DRSF identity.

The user equipment may be adapted to initiate device-to-device to cellular mode switching request to common control node/DRSF.

In a sixth embodiment is provided a network element or processor therefor, adapted to receive, directly or indirectly, from a first user equipment in a device-to-device connection with at least a second user equipment, a connection or handover request and/or data pertaining to a handover/connection. It may be a NodeB, RAN, common network node, or DRSF.

The network element may be adapted to initiate a handover/connection based on said data, connection or handover request.

The data/request may comprise one or more of the following: information indicative of load-balancing; candidates for a targeted serving cell; RSRP or other measurements pertaining of one to more of said user equipments, and/or differences therebetween; load status; configuration change on cell basis from local RANs and/or current serving RAN, and/or any further data relating to device-to-device communications.

The network element may be adapted to select which of the user equipments is said first user equipment.

The selection may be based on operator's Radio Access Technology, roaming restrictions, user equipment capabilities, channel states, battery power status or service indications, and/or measurement reports from user equipments and/or serving RANs.

In a seventh aspect is provided a method of controlling device-to-device communications between user equipment, wherein the mobility of a control plane for a device-to-device connection is triggered and/or maintained by a common network element and/or a Radio Access Network (RAN) and user plane mobility is controlled either by said common network element/RAN or by at least one of said user equipment.

The method may include i) triggering a handover to a target RAN by the current serving cell or common network element; ii) redirecting the device-to-device connection to use common resources and/or an unlicensed band during hand-over; iii) switching at least one of the user equipment back to the regular cellular mode on the control plane and attempting to carry out a handover to said target RAN; and iv) re-establishing control of the device-to-device connection.

The method may include additionally reconfiguring radio bearers and/or allocated resources for the device-to-device connection by said common network element and/or new serving RAN.

It may include determining if said handover of the device-to-device connection is successful by said common network element and/or new serving RAN and if not, establishing user-plane cellular bearer services for the user equipments and completing the mode switching from device-to-device mode to regular cellular access mode for both of the user equipment.

Any of said steps may be performed by a common network element and/or current serving RAN.

In a seventh embodiment is provided a network element, communications system, or processor therefor, adapted to perform one or more of the above method. It may be a common network element and/or current serving RAN.

In further embodiments are provided a computer program comprising program code means adapted to perform the steps of any of the methods and a computer readable medium comprising such a computer program of claim.

BRIEF DESCRIPTION OF THE SEVERAL VIEWS OF THE DRAWINGS

For a better understanding of the present invention and how the same may be carried into effect, reference will now be made by way of example only, and to the accompanying drawings in which.

DETAILED DESCRIPTION OF THE INVENTION

Figure 1:
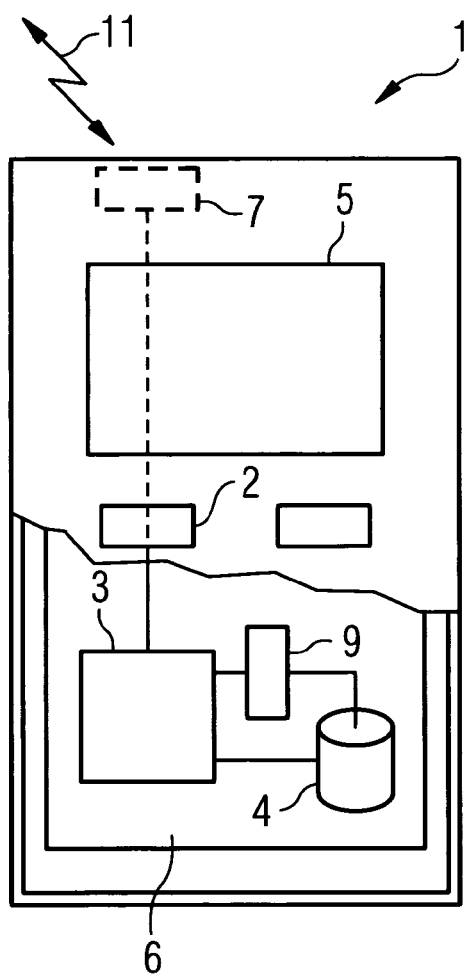
FIG. 1 shows an example of user equipment according to embodiments of the invention.

In the following certain exemplifying embodiments are explained with reference to wireless or mobile communication systems serving mobile communication devices. Before explaining in detail the certain exemplifying embodiments, certain general principles of a wireless communication system and mobile communication devices are briefly explained with reference to FIG. 1 to assist in understanding the technology underlying the described examples.

A communication device can be used for accessing various services and/or applications provided via a communication system. A typical communication system may comprise a number of cells each associated with particular fixed base stations. Non-limiting examples of appropriate access nodes are a base station of a cellular system, for example what is known as NodeB or enhanced NodeB (eNB) in the vocabulary of the 3GPP specifications. Other examples include base stations of systems that are based on technologies such as wireless local area network (WLAN) and/or WiMax (Worldwide Interoperability for Microwave Access). The base stations may be in communication with a Network Controller (not shown). A UE may be located at a particular location within a particular cell. Each cell (and/or base station) has associated with it a general topological/geographical location, shown generally as encompassed by the broken lines in the figure. The base stations may be connected to a wider communications network. A gateway function may also be provided to connect to another network. This further network may also be connected to a further access system, which serves user devices. Base stations may be provided by different network operators.

A communication device can be used for accessing various services and/or applications through the communication system. A mobile communication device is typically provided wireless access via at least one base station or similar wireless transmitter and/or receiver node of the access system. A base station site can provide one or more cells of the plurality of cells of a cellular communication system. The communication devices can access the communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. An example of the more recent developments in the standardization is the long-term evolution (LTE) of the Universal Mobile Telecommunications System (UMTS) radio-access technology that is being standardized by the 3rd Generation Partnership Project (3GPP). A further development of the LTE is referred to as LTE-Advanced. Other techniques may be used such as orthogonal frequency divisional multiple access (OFDMA) and SC-FDMA, e.g. for downlink and uplink operation respectively.

FIG. 1 shows a schematic, partially sectioned view of a communication device 1 that can be used for communication with a communication system. An appropriate mobile communication device may be provided by any device capable of sending and receiving radio signals. Non-limiting examples include a UE, a portable computer provided with a wireless interface card or other wireless interface facility, personal data assistant (PDA) provided with wireless communication capabilities, or any combinations of these or the like. A mobile communication device may be used for voice and video calls, for accessing service applications and so on. The mobile device may receive signals over an air interface 11 via appropriate apparatus for receiving and may transmit signals via appropriate apparatus for transmitting radio signals. A transceiver is designated schematically by block 7. The transceiver may be provided for example by means of a radio part and associated antenna arrangement. The antenna arrangement may be arranged internally or externally to the mobile device. A mobile device is also typically provided with at least one data processing entity 3, at least one memory 4 and other possible components 9 for use in software aided execution of tasks it is designed to perform, including control of access to and communications with access systems. The data processing, storage and other relevant control apparatus can be provided on an appropriate circuit board and/or in chipsets. This feature is denoted by reference 6. The controller may include functionality to carry out any embodiments of the invention. The user may control the operation of the mobile device by means of a suitable user interface such as key pad 2, voice commands, touch sensitive screen or pad, combinations thereof or the like. A display 5, a speaker and a microphone are also typically provided. Furthermore, a mobile communication device may comprise appropriate connectors (either wired or wireless) to other devices and/or for connecting external accessories, for example hands-free equipment, thereto.

In prior art D2D communications systems, involved networks coordinate to setting up of possible D2D communications on a request from a calling UE; the called UE may be assumed to be previously in the IDLE state. Such systems require D2D capable UEs to be able to discover each other beforehand. This requirement implies some distributed UE beaconing or sensing is needed. This puts burden on the UEs and consumes additional radio resources resulting in notable protocol overhead and interference. Furthermore the prior art does not consider multi-radio aspects and their impacts on resource allocation and control of D2D communications. It is also important for the involved networks to be able to initiate and control D2D communications for the UEs, regardless of the current cellular state of the UEs, i.e., whether the UEs are in IDLE or CONNECTED state of the corresponding cellular networks.

Certain embodiments may make use of a common network node (alternatively referred to as a common network controller, common network controller server or (common) device-to-device Registration Server Function (DRSF), into the network architectures of systems such as 3GPP. This enables commonly co-ordinated network-initiated and network-controlled D2D communications across relevant multi-operator multi-radio cellular systems.

Figure 2:
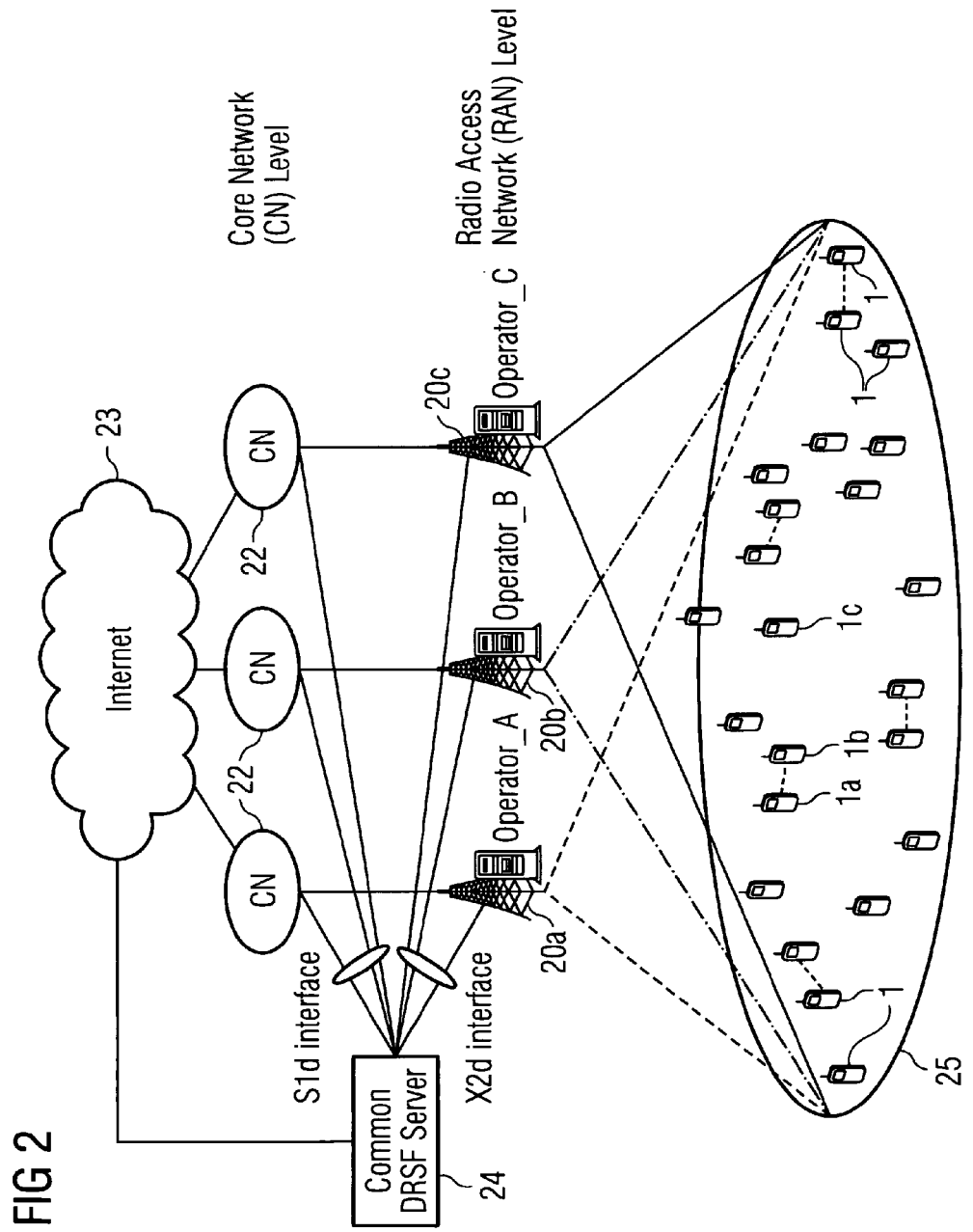
FIG. 2 shows a schematic representation of a device-to-device communication system which in which embodiments of the invention can be applied.

FIG. 2 illustrates how a common network control server such as a DRSF may be utilised according to embodiments of the invention. Three base stations (and Radio Access Networks) pertaining to them 20a, 20b, 20c, may be provided by different operators Operator A, Operator B, and Operator C. Each of these may be considered as part of a Radio Access Network (RAN) and may be connected to respective core networks 22. These may be further connected to the Internet 23 or other gateways, nodes, systems (not shown). A DRSF server 24, common across several operator's networks, can interface with the respective core networks over a S1d interfaces and/or the RANs/base stations (node Bs) over a X2d interface. This provides support for D2D communications for UEs from one another over the same or overlapping service coverage areas. The area 25 shown in the figure represents an overlapped service coverage area provided by the three operators A, B and C. As the individual RANs and/or CNs of these operator's networks may be connected to the common DRSF via the designated interfaces, it allows for effective coordination and cooperation between the involved network systems in supporting multi-operator D2D. D2D capable UEs may register to the common DRSF upon entering a D2D registration area under management and control of the common DRSF. Mobility management entities (MMEs) (not shown) may also contain the D2D registration server function (DRSF). A number of user equipments 1 are shown such as mobile phones, and may be divided into those which are operated by operators A, B and C, designated with reference numerals 1a, 1b and 1c respectively. D2D communication allow user equipments to communicate directly, and embodiments of the invention assist in assisting making, assisting or controlling a D2D connections/handovers both for a communicating mobiles of the same or different operators.

The UEs 1 may be configured to communicate with at least one DRSF server over the network. In this regard, the DRSF Server may comprise a node of the network. For example, in some embodiments, the DRSF server may be partially embodied on one or more computing devices that comprise an element of a radio access network (RAN) portion of the network. In this regard, the DRSF Server may, for example, be at least partially embodied on an access point of the network (for example, a base station, node B, evolved node B). Additionally or alternatively, the DRSF Server may comprise one or more dedicated computing devices that comprise a portion of a RAN portion of the network. In some embodiments, the DRSF Server may be at least partially embodied on one or more computing devices that comprise a core network (CN) entity of the network. In this regard, the DRSF Server may, for example, be at least partially embodied on a mobility management entity (MME) of the core network. Additionally or alternatively, the DRSF Server may comprise one or more dedicated computing devices that comprise a portion of a CN portion of the network. As a further example, in some embodiments, a DRSF Server may be embodied in a hierarchical structure being embodied on elements of both a RAN portion and a CN portion of the network.

Regardless of where or how it is embodied, it will be appreciated that in some embodiments the DRSF apparatus is embodied as a plurality of computing devices that collectively provide functionality attributed to the DRSF Server. In embodiments wherein the DRSF Server is at least partially embodied as an access point, the DRSF Server may be configured to provide access to a network (for example, cellular network) to one or more UEs via a radio uplink. In such embodiments, the network may comprise one or more over-the-air radio links between the DRSF Server and one or more UEs. Such over-the air radio links may be implemented in accordance with any appropriate wireless networking (for example, cellular networking) standard.

Figure 3:
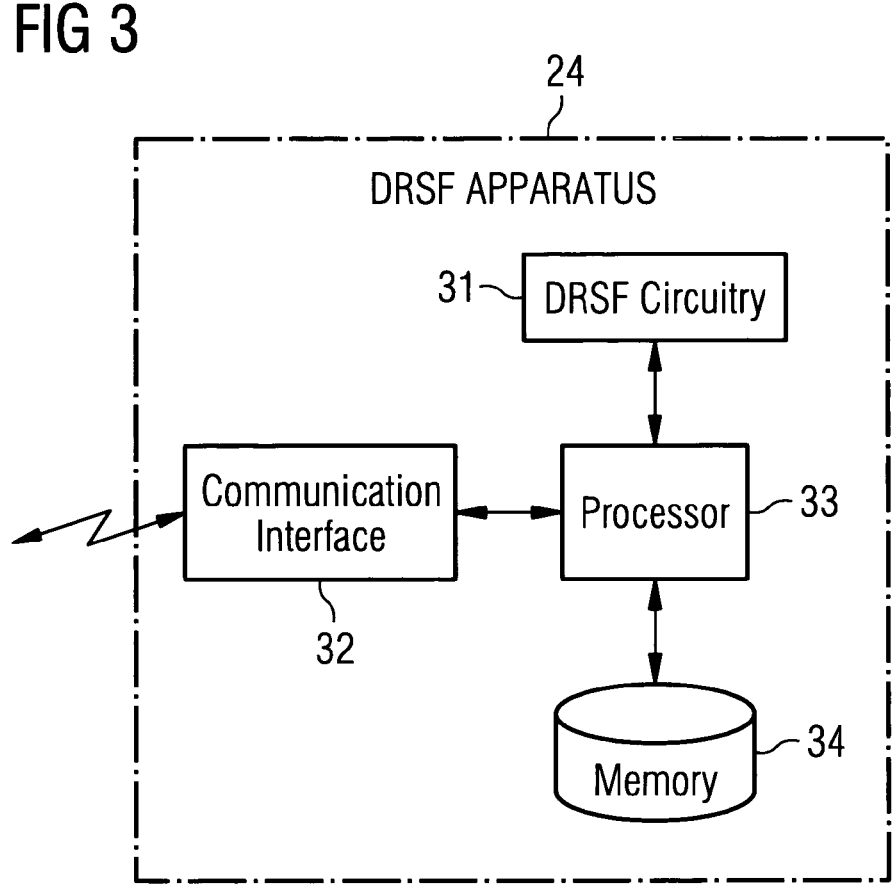
FIG. 3 shows a block diagram of a device-to-device registration server function (DRSF) apparatus according to an example of an embodiment of the invention.

FIG. 3 illustrates a block diagram of a DRSF Server for facilitating device-to-device connection establishment according to an example embodiment of the present invention. In an example embodiment, the DRSF Server includes various means, such as a processor 33, memory 34, communication interface 32, and DRSF circuitry 31 for performing the various functions herein described. These means of the DRSF Server as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 34) that is executable by a suitably configured processing device (for example, the processor 33), or some combination thereof.

Embodiments may use network-initiated multi-operator multi-radio D2D communications with assistance of the common DRSF in handling the following functions: connection setup, resource allocation, mode switching, handover, and/or charging.

Enhanced embodiments allow integration of a common DRSF into the network architectures of involved systems, especially 3GPP ones. Embodiments also may support applications relating to reuse or utilization of existing cellular systems to support advanced D2D, especially as multiple RATs and network systems are evolved. Embodiments allow instance GERAN or UTRAN operators to utilize D2D capability of advanced UE devices so as to enhance their otherwise exhaustive cellular capacity in serving users in hot-spots.

Further embodiments relate to methods and signalling mechanisms to provide support of network-initiated D2D communications in multi-operator multi-radio environments.

Figure 4:
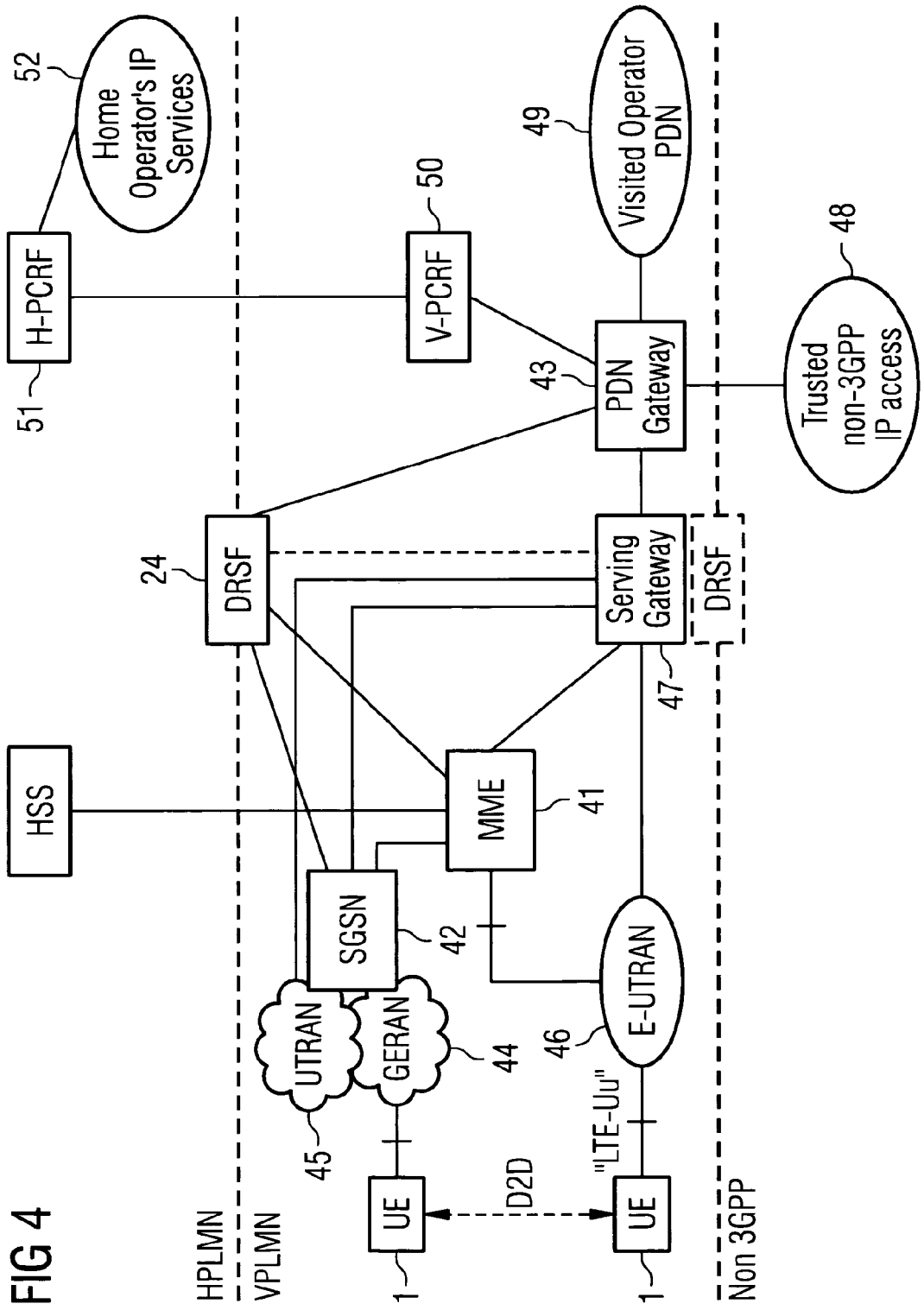
FIG. 4 shows a schematic representation showing a DRSF and how it and other network elements are connected in an example of a communication system which may employ embodiment of the invention; and, FIG. 5a illustrates a known set up procedure for establishing connection between two user equipment and 5b illustrates a subsequent network initiated multi-operator set-up according to one embodiment for establishing a device-to-device connection.

FIG. 4 shows a schematic representation showing a DRSF and how it and other network elements may be connected in an example of a communication system in which embodiments of the invention can be manifested. It illustrates how a common DRSF can be integrated into the network architectures of cellular systems involved in supporting multi-operator multi-radio D2D. The common DRSF may be connected to an MME 41 and Serving GPRS Support Node (SGSN) 42 for 3GPP systems, and connected to Packet Data Network (PDN) Gateway for non-3GPP cooperation. In turn the SGSN may be part of a GSM/Edge Radio Access Network (GERAN) 44 and/or UMTS Terrestrial Radio Access Network (UTRAN) 45. In the figure the DRSF is shown logically located between the Home Public Land Mobile Network (HPLMN) Visitor Public Land Mobile Network (VPLMN). The MME is may be connected to an E-UTRAN system 46, which is in communication with a UE over the LTE Uu interface. The Evolved UMTS Terrestrial Radio Access Network (E-UTRAN) is also connected to serving gateway. This serving gateway 47 may be connected to the PDN Gateway. The PDN gateway may be further connected to a Visited Operator Packet Data Network 49, and trusted non-3GPP IP access. The PDN Gateway is connected to a Visitor-Policy and Charging Rules Function (PCRF) 50 which is further connected to a Home-PCRF 51 in the HPLMN which in turn connected to the Home Operators IP Service 52.

Where overlapping D2D service areas can be considered as local or isolated in e.g. a hot spot, campus, village, etc., then the common DRSF may be a local server which can be operated by a third party as well. In this case, the common DRSF may also be distributed and connected at RAN level to provide faster coordination and control of D2D.

The common DRSF may configure and manage multi-operator D2D registration areas with tight location mapping and based on potential D2D ranges. Common D2D registration areas with the same identities (Ids) across all involved operators as in the prior art may not be necessary.

The common DRSF may assist or take part in the following network functions in supporting multi-operator multi-radio D2D:

a) Network Access Control Functions: e.g. authentication of D2D users, admission control and reselection of hosting RAN, coordination of selected hosting RANs in charging and policy enforcement.

b) Mobility Management Functions: e.g. D2D registration and reachability, mobility restriction, hosting RAN change, mode switching.

c) Security Functions: e.g. coordination, derivation and distribution of D2D security key components for D2D sessions.

d) Radio Resource Management Functions: e.g. inter-system or inter-cell coordination for D2D resource allocation, setting and controlling certain resource allocation parameters, redirecting D2D users to access other spectrum resources or hosting RAN.

Embodiments of the invention also may provide for Network Management Functions which involve load balancing among involved network systems and spectrum resources. Further embodiments may also include the following functionality:

e) The common DRSF may terminate certain D2D related network functions (e.g., control, management, and coordination functions and services) of involved RANs and network systems as well as UEs. The common DRSF may communicate with the UEs conducting D2D under its supervision for the following; D2D security update request, D2D resource allocation request or D2D serving RAN relocation request.

f) In applications such as local, home environments or meeting rooms where one could contact machines or kind of secondary devices by using UEs acting as a gateway for operating a M2M network, the authentic cellular device or UE may request from the common DRSF suitable local resources.

Roaming restrictions may be maintained in general but relaxed to some certain extents in supporting network-initiated multi-operator multi-radio D2D. For instance, hosting RAN may provide radio access and control for UE(s) of other operator(s) to conduct D2D using its resources or under its supervision, but not non-access-stratum (NAS) (except for accessing the common DRSF if considered using NAS) and packet services. In this regard, a hosting RAN only needs to keep minimum UE contexts of the UE(s) of other operator(s) which may be provided by or via the common DRSF. If the UE(s) of other operator(s) offers services besides the D2D then these services are provided by its own home network. UE initiated enhancements including cell selection and reselection as introduced may not be required.

Network-Initiated D2D Connection Setup

Example 1

In one embodiment, a common DRSF may assist the network-initiated D2D connection setup as follows. The D2D setup is for suitable UEs being in CONNECTED state of involved cellular systems. E2E call setup between these UEs basically can follow the normal procedure first, and then depending on D2D capability of the UEs, the involved networks may inform the common DRSF about E2E call of the local UEs. The DRSF may check if the UEs are registered and in a suitable position to use D2D. The DRSF then initiate setting up D2D with the involved networks using, e.g., dedicated probing between the UEs, redirecting the UEs to suitable systems, etc. This is illustrated in FIG. 5 for an example, assuming that both operators A and B are of LTE.

Figure 5A:
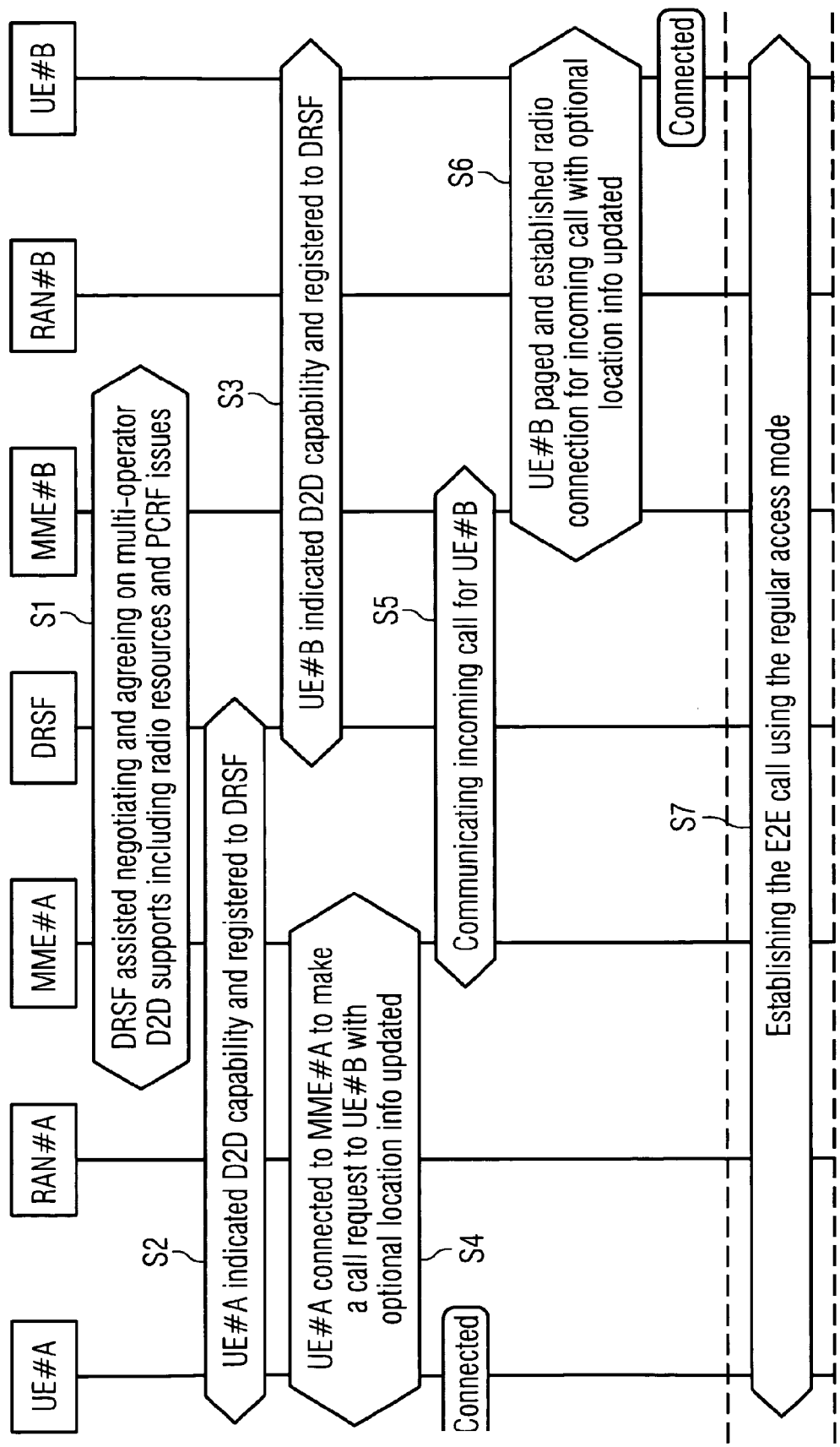
Figure 5B:
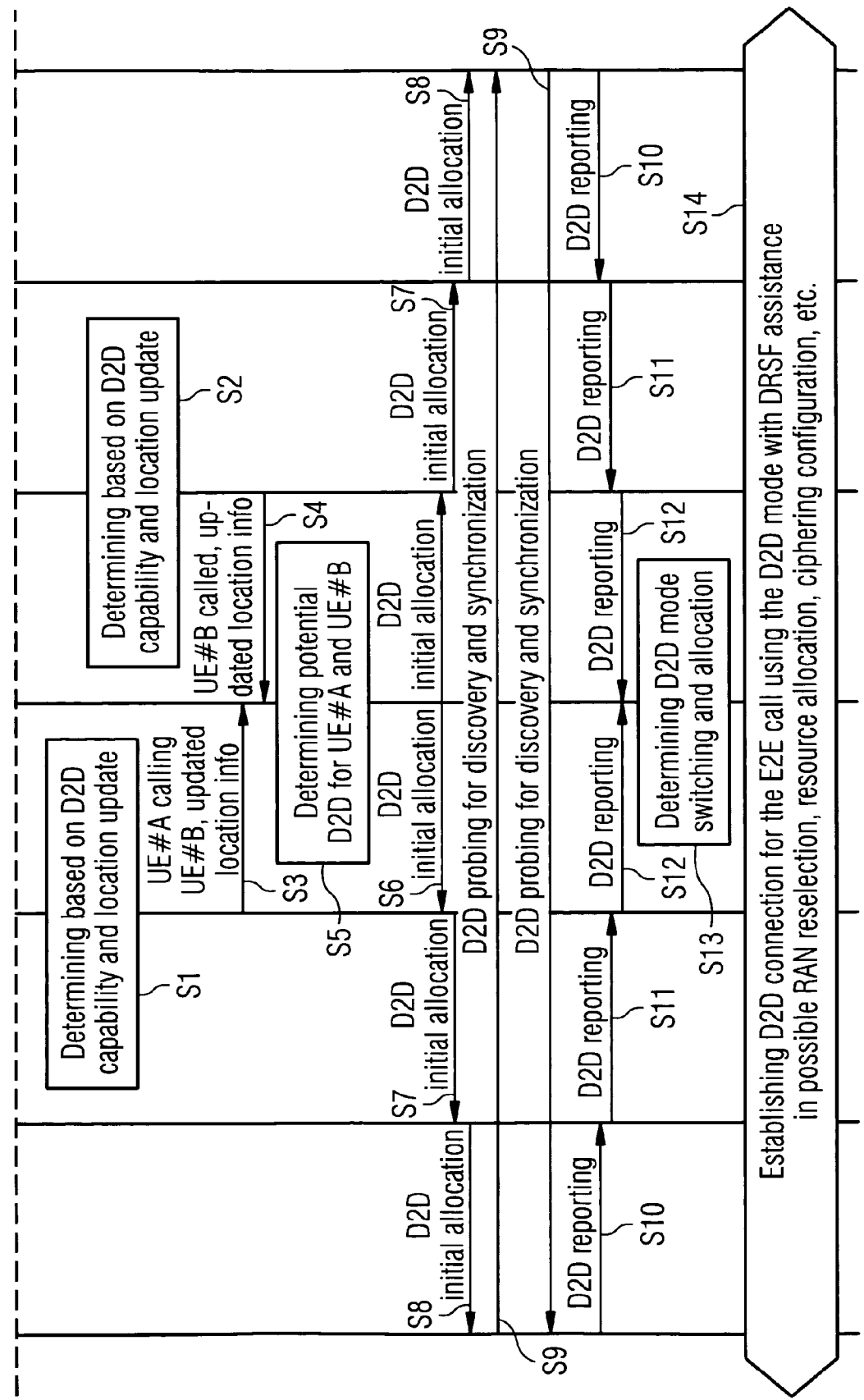

FIG. 5 compares a prior art method (FIG. 5a) and an embodiment (FIG. 5b). FIG. 5a shows how establishing an initial connection between user equipment. This is a conventional procedure. In step S1, the DRSF assists negotiating and agreeing multi-operator D2D supports including radio resources and Policy and Charging Rules Function (PCRF) issues. In step S2 a first UE, UE A indicates its D2D capability and/or registers with the DRSF. In step S3, similarly a second UE, UE B indicates its D2D capability to and registers with the DRSF. Such steps may be considered as prior steps which may occur at any suitable time (e.g., when a D2D capable UE detects that it is moving to a new D2D registration area).

In step S4 the UE A connects with the MME A to make a call request to UE B. The UE A may optionally updates its current location information to MME in this step. In step S5 there is a communication between the involved cellular systems (MME A and MME B) concerning an incoming call for UE B. The UE B at step S6 is paged and a radio connection is established for the incoming call S7. Optionally, current location information of the UE B may be updated to MME-B.

FIG. 5b illustrates establishing an D2D connection with DRSF assistance according to one embodiment.

Instead of establishing an end-to end call (E2E) using regular access mode as in S7 of FIG. 5a, in steps S1 and S2 of FIG. 5b, it is determined whether to make a call as detailed in step S3. These steps are performed by MME A; if it sees that UE A is D2D capable and location of UE A is desirable to use D2D mode. If not, MME A will not carry out S3 and E2E call setup will be using the regular cellular access mode. This is determined based on the D2D capability and location update and at step S2. At step S3 is determined based on D2D capability and location update. In step S3, MME A indicates DRSF about the UE A requesting a call to UE B; and provides DRSF with the updated location information of the UE A MME A is the entity in the network that may be able to determine and carry out this step, as the involved networks are trying to set up D2D connection for the requested call of the UE A. In step S4, UE B is called and may update location information. This is similar to step S3. At step S5, the DRSF determines the potential D2D for the two UEs: the DRSF sees whether both the UE A and the UE B are registered to it and, furthermore, their updated location information shows that they are in suitable positions for D2D setup. At step S6 the DRSF makes an initial allocation for to the UEs to check and reassure if D2D setup is really proper which is sent via steps S7 and S8 to the UEs. At steps S9 there is probing for discovery and synchronisation. At steps S10, S11 and S12, the UEs report back to the DRSF via RAN A, MME A and RAN B and MME B respectively. This feedback is used in step S13 to determine the D2D mode switching and allocation with necessary configurations and parameters. At step S14 is established the D2D connection for the E2E call using D2D mode with DRSF assistance in RAN selection, resource allocation, ciphering, configuration for example.

The use of e.g. a DSRF allows further embodiments relating to signalling mechanisms to provide efficient D2D connection and mobility management in multi-operator multi-radio environments:

Example 2

DRSF Assisted Hybrid Cellular Handover of Control-Plane (C-Plane) and Maintaining User-Plane or D2D Connection Using Common Resources or Redirected to Unlicensed Band During Hand-Over This embodiment may include the following steps: i) handover is triggered where the current serving cell/RAN/DSRF decides the target RAN. Then ii) the source serving RAN(s) may check with the DRSF and redirect the D2D connection to use common resources or unlicensed band for keeping it going during hand-over. The iii) source serving RAN(s), the target serving RAN(s) and DRSF may coordinate to switch at least one of the UEs back to the regular cellular mode. It is possible that only one of the UEs may need to be handed over at this point, the other may still keep its cellular connection while communicating with the first one using D2D. Cellular-controlled or even cellular-integrated D2D may be considered. A UE may transmit and receive in D2D while also communicating with serving RAN in cellular controlled or scheduled time-division fashion for instance, but only in the control plane (C-plane) and handover for the UE(s) using the regular cellular procedure. The DRSF and the new serving RAN(s) may iv) coordinate to re-establish and take back control of the D2D connection (there may be still a D2D connection but controlled not by devices) with possible reconfigurations of radio bearers and allocated resources. If this stage is failed for some reason, DRSF and the new serving RAN(s) may establish U-plane cellular bearer services for the UEs and completing the mode switching from D2D to regular cellular access for both of the UEs. This is therefore effectively a network triggered handover and may be considered a "hybrid method". The mobility of a control plane may be triggered and maintained by the network (DRSF and serving RAN) and user plane mobility could be either network controlled or autonomous by the D2D user equipment.

In a further set of embodiments, user equipment can be used to, either at least in part control D2D communications such as set-up or hand-over, or provide signalling mechanisms to assist in the control and/or handover (e.g. by other network elements). These two aspects also provide efficient D2D connection and mobility management in multi-operator and/or multi-radio environments.

These two sets of embodiment may also be considered as a "local approach" where e.g. one of the user equipment (this may be referred to as "master" UE) may control and selects e.g. a good cell candidate for handovers towards the other ("slave") UE in the D2D connection. The target RAN may then inform the controlling node/DRSF. There may be DSRF assisted location update and timers for D2D handover control. Thus it is a UE which performs a large part of the control of e.g. connections hangovers etc.

In the other ", however this is based on UE reports (e.g. reported measurements. Thus one or more of the UEs informs the controlling node/DRSF which will do perform inter-UEs coordination. In such embodiments DRSF assisted serving RAN may initiate hand-over. Alternatively it is the controlling node/DRSF which decides target cell/RAN, based again on UE measurements and possibly also on current serving RAN status indications. Thus in such embodiments UEs assist (and/or or serving RAN) assist DRSF initiate hand-over.

Mobility Management of D2D Connection

Hosting cellular RANs and systems may only be capable of providing DRSF bearer services and the DRSF may be responsible for allocating resources for D2D (e.g., LTE-A based D2D in EDGE/UTRAN environment), then allowing UE to initiate handover of D2D connection.

Example 3

UE Initiated Hand-Over

It such embodiments, one ("master") UE of the D2D connection may provide the primary control in mediating and controlling other UE(s) for D2D connection. During hand-over execution the D2D connection may be performed using the initial resource allocation assigned by DRSF on the common resources across multi-operator multi-radio environment or the currently allocated resources to keep synchronization between the UEs while trying to access a targeted RAN to indicate serving cell change and request a hand-over.
a) The master UE may detect that the D2D connection is moving out of the current serving cell and also suitable candidates for a targeted serving cell.
b) The master UE measures parameters indicative of power, e.g. RSRP, from neighbouring cells, to determine and select the best suitable target cells to re-establish/provide the cellular connection.
c) The master UE may signal the list of best suitable target cells to the slave UE in the device pair.
d) The slave UE may in turn measure RSRP from the best suitable target cells and chooses the best suitable target cell which, for instance, minimises the RSRP measurement difference between master and slave UEs. This avoids the situation where a new cell is good to one and bad to the other device causing quick trigger to a new handover of the latter device).
e) The slave UE may then signal the chosen suitable target cell to the master UE. This selection may give priority to the cell under control of the same DRSF, having the same operator or the same RAT as that of the current serving cell, etc.

To prepare for a future UE-initiated hand-over, the slave UE may further signal the RSRP measurement differences and cell identities (IDs) for suitable target cells as notified by the master UE to the slave UE. The master UE may then compute the RSRP difference for each suitable target cell. If the master UE is again moving out of the serving cell, it may prioritise/select based on the best RSRP differences. Cells with the smallest RSRP differences may be tried first by the master UE and slave UE repeating steps outlined above. For more general, the involved UEs may exchange their neighbour cell list and measurement and agree upon the selection of a best suitable candidate(s) for initiating HO.
f) The master UE may get access to the selected cell and sends a D2D hand-over request with details about current D2D connection including the current serving cell ID, DRSF identity, etc.
g) The selected RAN and DRSF may check and accept the D2D connection.
h) DRSF may then initiate a release of D2D resources from the old serving cell upon this hand-over of the D2D connection.

In an extreme case where a suitable target cell cannot be found by the master UE and slave UE during an UE initiated hand-over, the master UE may then initiate a D2D-to-cellular mode switching request to DRSF.

Example 4

DRSF Assisted Serving RAN Initiated Hand-Over

Embodiment(s) may be used in case UE initiated hand-over is not possible, for example where the UEs are in a different serving cell; in a different network; or there is operator preference for all D2D calls to be managed in a centralised way for traffic offloading and cellular/D2D interference co-ordination.

The serving RAN may initiate hand-over based on measurement reports from UE or due to load-balancing reasons.

The serving RAN communicates with DRSF for targeted cell and relevant configuration information. In intra-LTE case, hand-over optimization using X2 signalling between the source and target eNBs may be utilised.

The DRSF can select and communicate with the targeted RAN for the hand-over and updates the serving RAN.

The serving RAN communicates with UE for the hand-over. The DRSF may redirect a D2D connection of which UEs are being connected to different serving RANs of different operators to a third RAN of a third party due to e.g. roaming restrictions or D2D-serving RAN capabilities. In this case, hand-over may be initiated by any of the serving RANs and DRSF will coordinate the hand-over with the involved RANs.

Example 5

UE Assisted or Serving RAN Assisted DRSF Initiated Hand-Over

The DRSF may determine and initiate hand-over of D2D connection based on e.g. status or measurement reports from involved UE(s) or RAN(s).

The master UE may detect better suitable candidates for a targeted serving cell and report that to DRSF during the D2D connection via current serving RAN. The involved local RANs including current serving RAN may also report its load status, configuration change on cell basis, and other data relevant to D2D, to the DRSF.

Example 6

DRSF May Assist Active UEs in D2D in Cellular Location Update Upon, e.g., Tracking-Area Change During D2D Connection The DRSF may keep mapping between D2D registration areas and location tracking areas across relevant operators. In the case where the serving-cell or serving-system change of the D2D connection coincides with tracking area change of any of the UEs, the DRSF may detect, initiate and perform location update for the UE, on behalf of the UE, and keep the UE updated of e.g. the new location information and new paging ID via the serving cell.

The UE in D2D may belong to other operator to that of the current serving cell and may be able to monitor in downlink (DL) its own operator's network or home network during D2D connection mobility and detect tracking area change. In this case, the UE then may indicate DRSF about the change and DRSF may initiate necessary location update for the UE. However, DRSF can track the UE involved in D2D on the cell basis and send request (e.g. paging) to the right cell even the request is from another network than the current serving network.

Example 7

Timers for Enhancing Hand-Over Control of D2D Connection

The serving RAN may keep a D2D radio link failure timer. This timer may be started after not receiving an expected event. If no further signal is received from the expected D2D over this period (or a release request from DRSF not received) then the serving RAN may notify DRSF about the D2D connection and release the resources.

UE may keep a similar timer to initiate and execute UE initiated hand-over or recovery.

The DRSF may keep a similar timer, starting after receiving the notification from the serving RAN and if DRSF does not hear of the expected D2D over this period then DRSF delete the D2D connection contexts.

Example 8

Resource Allocation and Control on D2D Connection

In some of these embodiments; the DRSF assists in D2D master-slave selection, taking into account cellular operators' RATs and national roaming restrictions in addition to e.g. UE capabilities, channel states, battery power statuses, services, etc.

Example 8a

Implicit Control

In this example the UE initiates the connection becomes the master device and D2D communication is handled in the master device's operator resources (Operator A)

When applied to FDD systems and devices which have a UL receiver, the D2D slave device (Operator B's) may listen to D2D transmissions in Operator A's UL and simultaneously cellular transmissions on Operator B's DL. If the slave or master needs to transmit something on UL they may request gaps to D2D communication If the slave device is not able to listen to Operator A's resources so the master has to listen to the resource allocation and forward the resource allocation to the slave device over D2D connection During the D2D connection it is possible that the communication will be handed over to Operator B's resource which means that the slave device will become master.

Some resources for the master-slave control information exchange may be reserved (that are known to both UEs) or, the master indicates the new resources before the current allocation ended

Example 8b

Explicit Control

The DRSF may explicitly configure one UE as the master based on e.g. capability and status indications and measurement reports from UEs and serving RANs.

Note that the aforementioned master-slave structure of D2D may be just a practical or optimal option, not a limiting factor for the system.

In UE initiated hand-over, the master UE and slave UE may be in the same serving cell. Otherwise, the DRSF assisted serving RAN initiated hand-over may be used. If the master UE and slave UE are in a different cell, they may have different neighbour cell list as indicated via higher layer signalling by their respective serving eNBs. The master UE may not indicate a new suitable target cell to the slave UE if that new cell is not part of the slave UE best neighbouring cells. This may be needed by the slave UE for at least two reasons—(i) cellular hand-over; (ii) ability to detect its reference signals (carrier reference signal CRS at least, and primary/secondary synchronization channel P/S-SCH in case LTE network is not synchronised)

Neighbour cell measurements based on RSRP may reuse Rel-8 specifications.

The UE initiated hand-over allows user equipments to perform all measurements and select best suitable target cell in independently from the network. This reduces the signalling load for the network and also reduces time it takes for a D2D hand-over.

The DRSF assisted serving RAN initiated hand-over allows intra-RAT and inter-RAT D2D hand-over. It also allows load balancing and cellular-D2D interference coordination which is not possible with UE initiated hand-over.

The two procedures outlined above may be combined for optimized hand-over procedure.

Embodiments also allow D2D connection and mobility management with possible mode switching (between D2D and conventional cellular access modes) and handover of D2D connection (serving-cell or serving-system changes) due to, e.g., load balancing, user mobility or Quality of Service (QoS) control reasons in multi-operator multi-radio cellular environments.

Embodiments support seamless mobility for D2D connection of UEs belonging to different roaming-restricted operators in such scenarios where that the UEs are moving together, e.g., as on board of the same transportation vehicle such as train, ship, bus or plane or even in different cars following each other on road, is taken into considerations.

Embodiments also address resource allocation and control for D2D connection of UEs belonging to different roaming-restricted operators, including cases in which hosting or serving RANs and systems are only capable of providing DRSF bearer services and the DRSF is responsible for allocating resources for D2D connection (e.g., LTE-A based D2D operating in EDGE/UTRAN environment).

Embodiments also address the question is how to allow for instance GERAN or UTRAN operators to utilize D2D capability of advanced UE devices to enhanced their otherwise exhaustive cellular capacity in serving users in hot-spots.

In particular, the adoption of common DRSF across several operators' networks which support D2D for UEs from one another over the same or overlapping service coverage areas is assumed.

The above described functions can be provided by means of appropriate software and data processing apparatus. Functions may be incorporated into any appropriate network element or management system and may be provided by means of one or more data processors. The data processor may be provided by means of, for example, at least one chip. Appropriate data processing may be provided in a processing unit provided in association with a communication device, for example a mobile station. The data processing may be distributed across several data processing modules. The above described functions may be provided by separate processors or by an integrated processor. An appropriately adapted computer program code product or products may be used for implementing the embodiments, when loaded on an appropriate data processing apparatus. The program code product for providing the operation may be stored on and provided by means of an appropriate carrier medium. An appropriate computer program can be embodied on a computer readable record medium. A possibility is to download the program code product to a communication device via a data network.

It is also noted that although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention

What is claimed is:

1. A method comprising:
    detecting, by a first user equipment, that a handover of an existing direct device-to-device connection between the first user equipment and a second user equipment is needed by detecting that the existing direct device-to-device connection is moving out of a current serving cell;
    selecting at least one candidate target cell for the handover;
    signalling an indication of the at least one candidate target cell to the second user equipment;
    receiving, from the second user equipment, second user equipment-specific information related to the indicated at least one candidate target cell;
    selecting the target cell on the basis of the received second user equipment-specific information; and
    accessing the selected target cell for sending a request for the handover of the existing direct device-to-device connection,
    wherein the method is a method for initiating the handover of the existing direct device-to-device connection between the first and the second user equipment by the first user equipment.

2. The method as claimed in claim 1 wherein the handover is performed using an initial resource allocation assigned by a common control node, device-to-device registration server function, Radio Access Network or NodeB.

3. The method as claimed in claim 1 including measuring by the first user equipment Reference Symbol Received Power (RSRP) or any other parameter from one or more neighbouring cells in order to select the candidate target cells.

4. The method as claimed in claim 1, wherein said selecting allocates priority to a cell under control of the same Common Network Node, device-to-device registration server function, and/or having the same operator and/or the same Radio Access Technology (RAT) as that of the current serving cell.

5. The method as claimed in claim 1, wherein said request includes information concerning the existing direct device-to-device connection.

6. The method as claimed in claim 5 further comprising:
    initiating, by the first user equipment, a device-to-device to cellular mode switching request to the Common Network Node/device-to-device registration server function.

7. The method as claimed in claim 1, wherein said selecting is based on minimizing the difference in a given parameter indicative of power between the first and second user equipments.

8. An apparatus comprising:
    a transceiver;
    at least one memory including computer program code, and
    at least one processor, the at least one memory and the computer program code configured, with the at least one processor, to cause the apparatus, the apparatus being a first user equipment or being included in a first user equipment, to perform at least the following:
    initiating a handover of an existing direct device-to-device connection between the first and a second user equipment by:
    detecting that the handover of the existing device-to-device connection is needed by detecting that the existing direct device-to-device connection is moving out of a current serving cell;
    selecting at least one candidate target cell for the handover;
    signalling an indication of the at least one candidate target cell to the second user equipment;
    receiving, from the second user equipment, second user equipment-specific information related to the indicated at least one candidate target cell;
    selecting the target cell on the basis of the received second user equipment-specific information; and
    accessing the selected target cell for sending a request for the handover of the existing direct device-to-device connection.

9. The apparatus as claimed in claim 8, wherein the at least one memory and the computer program code are further configured, with the at least one processor, to cause the apparatus to perform at least the following:
    performing the handover using an initial resource allocation assigned by a common network node, device-to-device registration server function, Radio Access Network or NodeB.

10. The apparatus as claimed in claim 8, wherein the at least one memory and the computer program code are further configured, with the at least one processor, to cause the apparatus to perform at least the following:
    sending reports pertaining to initiation of handovers in the existing device-to-device connection between the apparatus and the second user equipment.

11. The apparatus as claimed in claim 10, wherein the at least one memory and the computer program code are further configured, with the at least one processor, to cause the apparatus to perform at least the following:
    allocating priority for said selection to a cell under control of a same Common Network Node, device-to-device registration server function, and/or having the same operator and/or the same Radio Access Technology (RAT) as that of the current serving cell.

12. The apparatus as claimed in claim 10, wherein the at least one memory and the computer program code are further configured, with the at least one processor, to cause the apparatus to perform at least the following: initiating a device-to device to cellular mode switching request to a common network node/device-to-device registration server function.

13. The apparatus as claimed in claim 8, wherein said handover request includes one or more of information concerning the existing device-to-device connection; or current serving cell identity, or Common Network Node/device-to-device registration server function identity.

14. The apparatus as claimed in claim 8, wherein said selecting is based on minimizing the difference in a given parameter indicative of power between the first and second user equipments.

15. A method comprising:
   detecting, by a first user equipment, that a handover of an existing direct device-to-device connection between the first user equipment and a second user equipment is needed by detecting that the existing direct device-to-device connection is moving out of a current serving cell;
   selecting at least one candidate target cell for the handover;
   signalling an indication of the at least one candidate target cell to the second user equipment;
   receiving, from the second user equipment, an indication of a proposed target cell selected by the second user equipment, wherein the proposed target cell minimizes the difference in a given parameter indicative of power between the first and second user equipments;
   selecting the proposed target cell as the target cell; and
   accessing the selected target cell for sending a request for the handover of the existing direct device-to-device connection,
   wherein the method is a method for initiating the handover of the existing direct device-to-device connection between the first and the second user equipment by the first user equipment.

16. An apparatus comprising:
   a transceiver;
   at least one memory including computer program code, and
   at least one processor, the at least one memory and the computer program code configured, with the at least one processor, to cause the apparatus, the apparatus being a first user equipment or being included in a first user equipment, to perform at least the following:
   initiating a handover of an existing direct device-to-device connection between the first and a second user equipment by:
   detecting that the handover of the existing device-to-device connection is needed by detecting that the existing direct device-to-device connection is moving out of a current serving cell;
   selecting at least one candidate target cell for the handover;
   signalling an indication of the at least one candidate target cell to the second user equipment;
   receiving, from the second user equipment, an indication of a proposed target cell selected by the second user equipment, wherein the proposed target cell minimizes the difference in a given parameter indicative of power between the first and second user equipments;
   selecting the proposed target cell as the target cell; and
   accessing the selected target cell for sending a request for the handover of the existing direct device-to-device connection.

* * * * *